(12) United States Patent
Son et al.

(10) Patent No.: US 12,614,807 B2
(45) Date of Patent: Apr. 28, 2026

(54) BATTERY PACK INCLUDING MEMBER CAPABLE OF PREVENTING POOR CONTACT WITH DEVICE

(71) Applicant: LG ENERGY SOLUTION, LTD., Seoul (KR)

(72) Inventors: Hyuk Joon Son, Daejeon (KR); Jin Hyun Lee, Daejeon (KR); Jae Young Jang, Daejeon (KR); Jae Hyung Kim, Daejeon (KR); Dae Ho Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 633 days.

(21) Appl. No.: 17/915,897

(22) PCT Filed: Dec. 21, 2021

(86) PCT No.: PCT/KR2021/019544
§ 371 (c)(1),
(2) Date: Sep. 29, 2022

(87) PCT Pub. No.: WO2022/154295
PCT Pub. Date: Jul. 21, 2022

(65) Prior Publication Data
US 2023/0139879 A1 May 4, 2023

(30) Foreign Application Priority Data
Jan. 12, 2021 (KR) ........................ 10-2021-0004205

(51) Int. Cl.
H01M 50/284 (2021.01)
H01M 50/204 (2021.01)
H01R 12/71 (2011.01)

(52) U.S. Cl.
CPC ....... H01M 50/284 (2021.01); H01M 50/204 (2021.01); H01R 12/716 (2013.01)

(58) Field of Classification Search
CPC .. H01M 50/204; H01M 50/284; H01R 12/71; H01R 12/716
(Continued)

(56) References Cited

U.S. PATENT DOCUMENTS

2008/0153359 A1     6/2008   Ma
2010/0203363 A1     8/2010   Kwak et al.
(Continued)

FOREIGN PATENT DOCUMENTS

CN        101867112 A      10/2010
CN        104981922 B       1/2019
(Continued)

OTHER PUBLICATIONS

Extended European Search Report for European Application No. 21919919.7, dated Jun. 25, 2024.
(Continued)

*Primary Examiner* — Kevin P Kerns
(74) *Attorney, Agent, or Firm* — Birch, Stewart, Kolasch & Birch, LLP

(57)                ABSTRACT

Discussed is a battery pack which may include a plurality of battery cells, a pack case configured to receive the plurality of battery cells therein, the pack case including a lower case and an upper cover, a connector located in the pack case, the connector being configured to electrically connect the battery pack to a device, and a printed circuit board (PCB) in the pack case, the connector being coupled to one surface of the PCB, wherein the upper cover includes a plurality of pin insertion ports configured to allow a device pin to be inserted into the connector therethrough, and wherein the upper cover is provided at an inside thereof with a support member
(Continued)

located adjacent the connector, the support member being configured to restrict deformation of the connector.

12 Claims, 4 Drawing Sheets

(58) Field of Classification Search
USPC ............................................................. 429/9
See application file for complete search history.

(56) References Cited

U.S. PATENT DOCUMENTS

| | | |
|---|---|---|
| 2010/0291434 A1 | 11/2010 | Byun et al. |
| 2013/0089756 A1 | 4/2013 | Kwag |
| 2013/0154565 A1 | 6/2013 | Sakai et al. |
| 2013/0288530 A1 | 10/2013 | Zhao |
| 2015/0303446 A1 | 10/2015 | Jung |
| 2017/0352852 A1 | 12/2017 | Son et al. |
| 2020/0176724 A1 | 6/2020 | Mao et al. |

FOREIGN PATENT DOCUMENTS

| | | | |
|---|---|---|---|
| CN | 211480415 | U | 9/2020 |
| EP | 2 224 517 | A1 | 9/2010 |
| EP | 3 660 951 | A2 | 6/2020 |
| JP | 2010-182669 | A | 8/2010 |
| JP | 2013-114782 | A | 6/2013 |
| JP | 2014-203704 | A | 10/2014 |
| KR | 10-2010-0123067 | A | 11/2010 |
| KR | 10-2014-0082271 | A | 7/2014 |
| KR | 10-1594012 | B1 | 2/2016 |
| KR | 10-1621182 | B1 | 5/2016 |
| KR | 10-2016-0125219 | A | 10/2016 |
| KR | 10-1770325 | B1 | 8/2017 |
| KR | 10-1798525 | B1 | 12/2017 |
| KR | 10-1903228 | B1 | 10/2018 |
| KR | 10-2099704 | B1 | 4/2020 |
| KR | 10-2158260 | B1 | 9/2020 |

OTHER PUBLICATIONS

International Search Report for PCT/KR2021/019544 mailed on Apr. 6, 2022.
European Communication pursuant to Article 94(3) EPC for European Application No. 21 919 919.7, dated Apr. 17, 2025.

【FIG. 1】 -- Conventional Art --
10
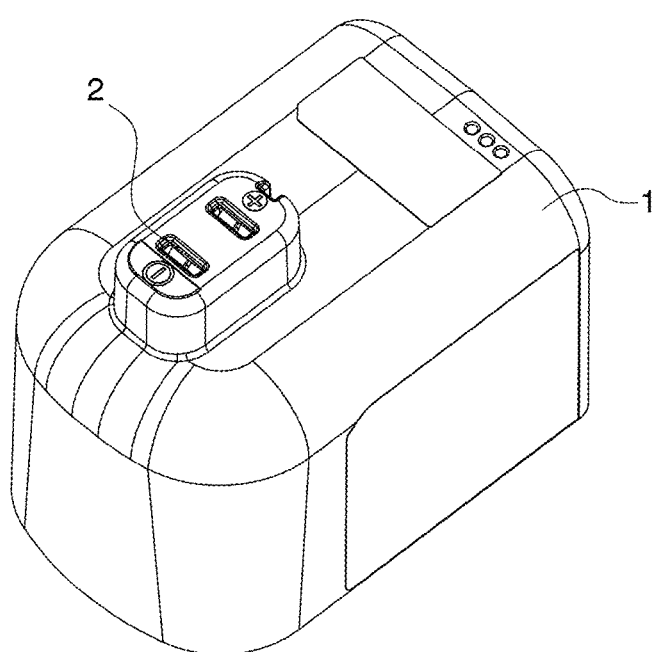
【FIG. 2】 -- Conventional Art --
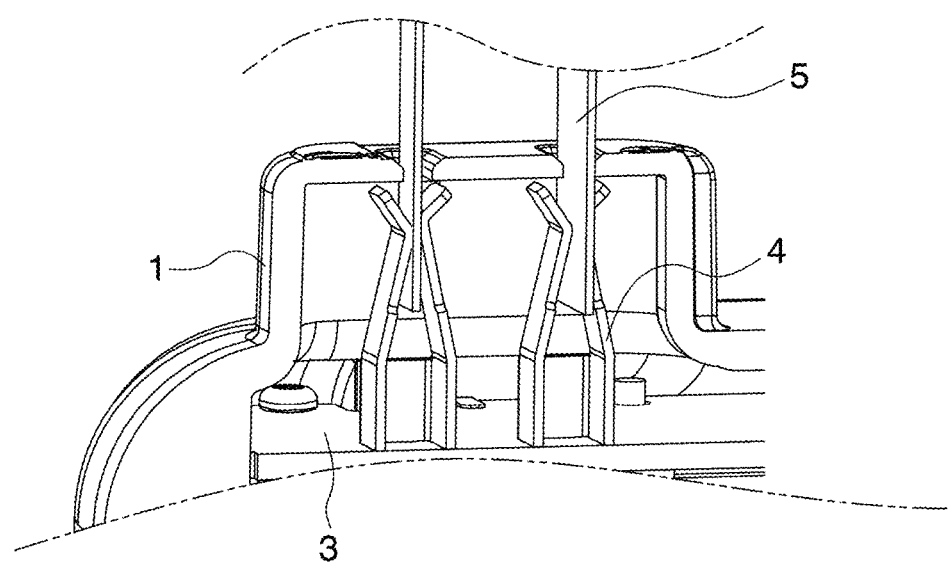

【FIG. 3】
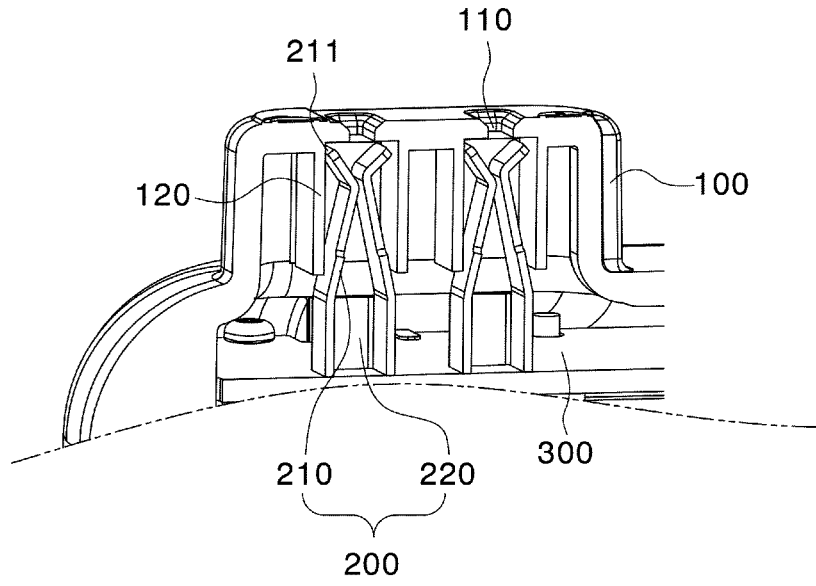
【FIG. 4】
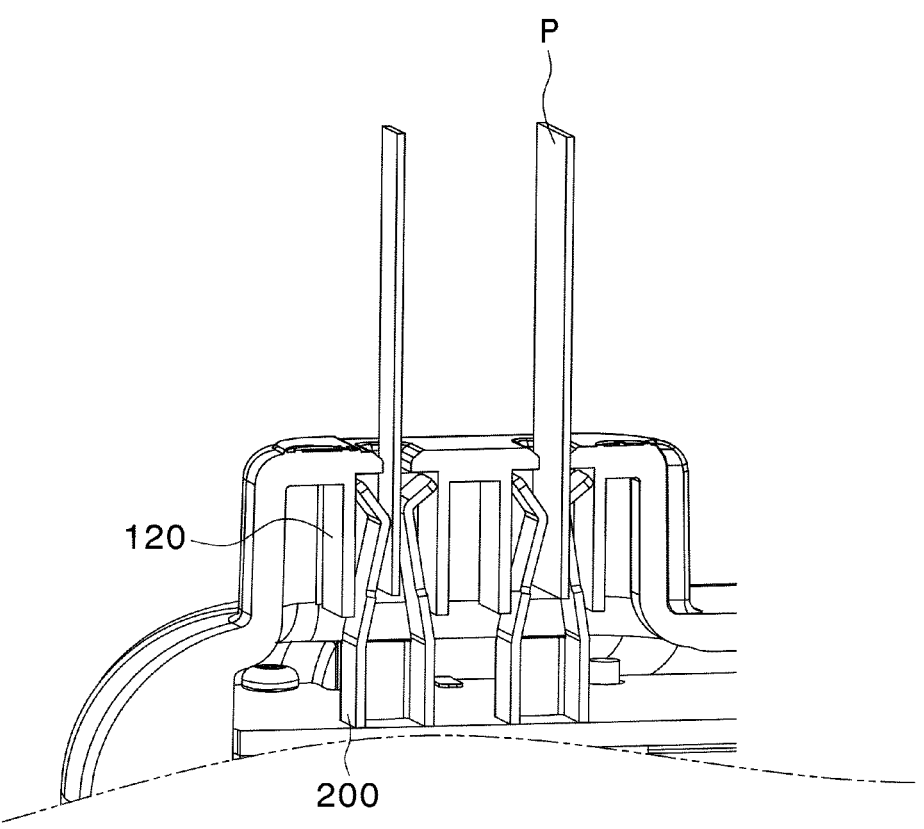

【FIG. 5】
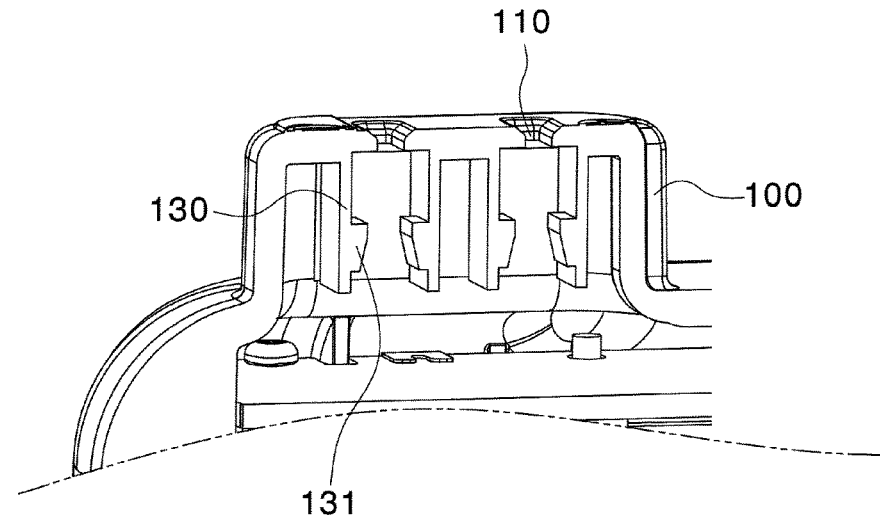
【FIG. 6】
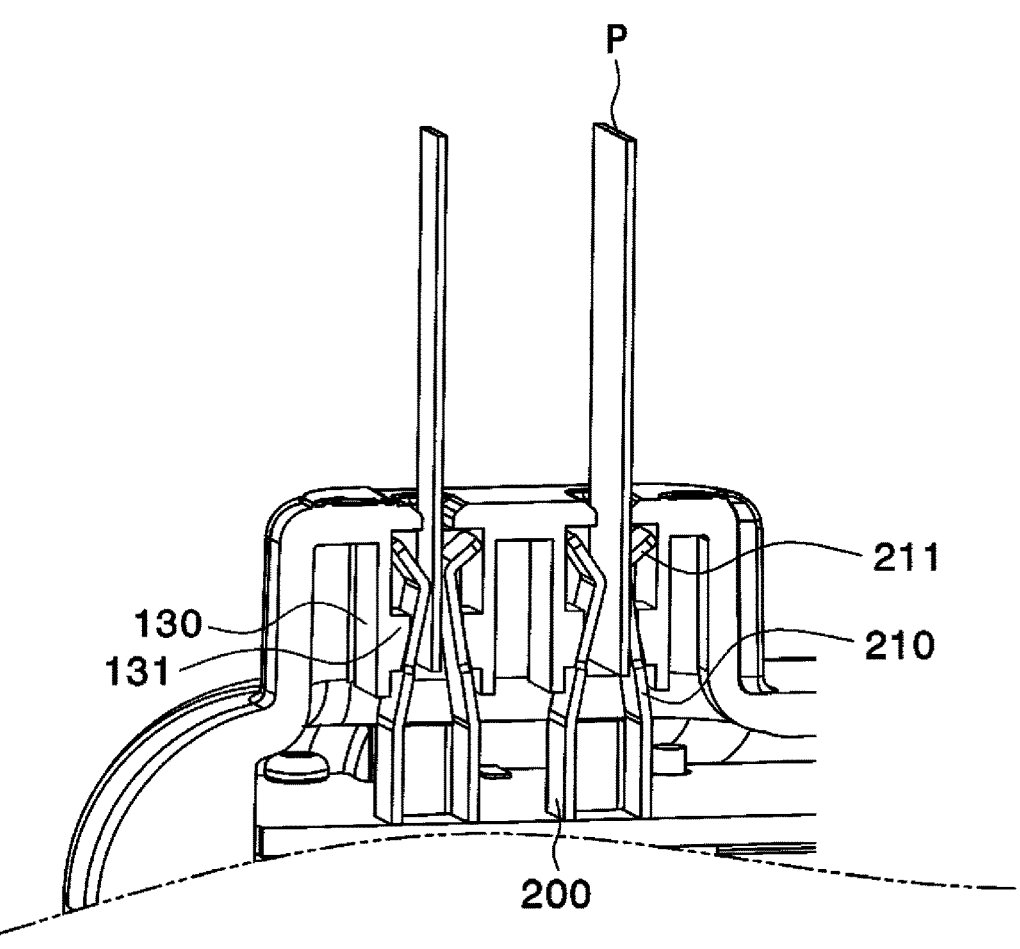

【FIG. 7】
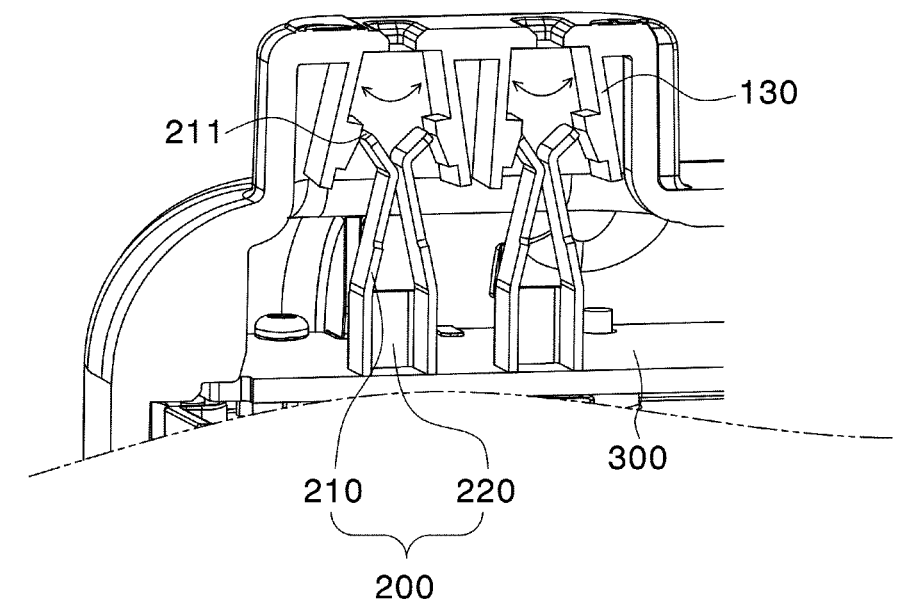
【FIG. 8】
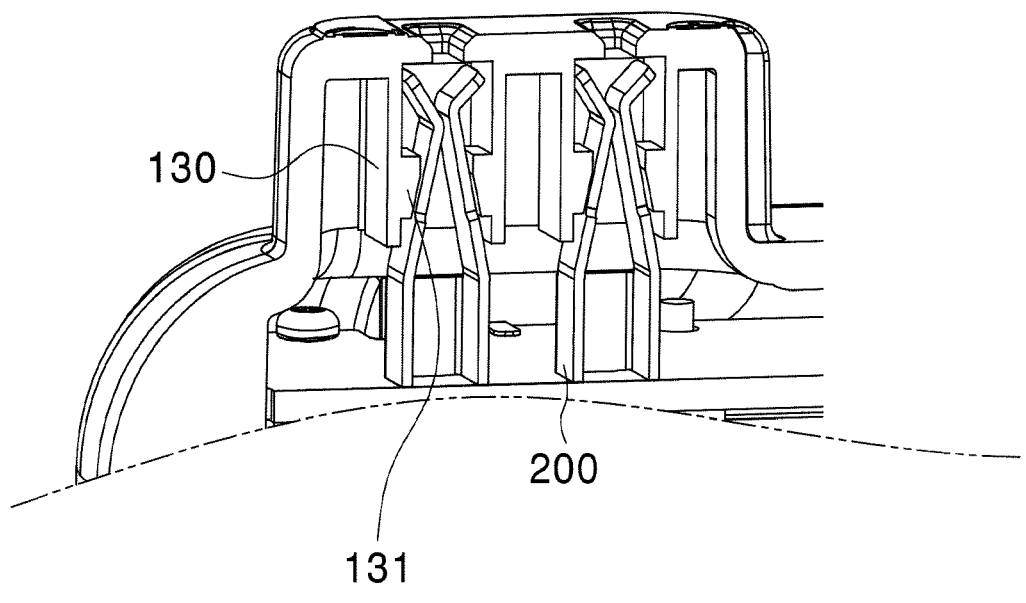

BATTERY PACK INCLUDING MEMBER CAPABLE OF PREVENTING POOR CONTACT WITH DEVICE

TECHNICAL FIELD

This application claims the benefit of priority to Korean Patent Application No. 2021-0004205 filed on Jan. 12, 2021, the disclosure of which is incorporated herein by reference in its entirety.

The present invention relates to a battery pack including a support member provided around a connector, thereby preventing poor contact with a device pin due to deformation of the connector.

BACKGROUND ART

With technological development of mobile devices, such as smartphones, laptop computers, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), a plug-in hybrid electric vehicle (P-HEV), and an energy storage system (ESS).

There are a lithium ion battery, a lithium polymer battery, a nickel-cadmium battery, a nickel-hydride battery, and a nickel-zinc battery as secondary batteries that are widely used at present. The operating voltage of a unit secondary battery cell, i.e. a unit battery cell, is about 2.0V to 5.0V. In the case in which output voltage higher than the above operating voltage is required, therefore, a plurality of battery cells may be connected to each other in series to constitute a cell module assembly. In addition, cell module assemblies may be connected to each other in series or in parallel to constitute a battery module depending on required output voltage or charge and discharge capacities. In general, a battery pack is manufactured using at least one battery module by adding an additional component.

The battery pack may be electrically connected to various devices through a connector.

FIG. 1 is a perspective view schematically showing a portion of a conventional battery pack, and FIG. 2 is a perspective view schematically showing the section of a conventional connector into which a device pin is inserted.

When describing the structure of the connector configured to connect the conventional battery pack and a device to each other with reference to FIGS. 1 and 2, the battery pack is configured to have a structure in which one or more battery modules or battery cells are received in a case.

The case generally includes a lower case and an upper cover 1, wherein a pin insertion port 2, into which a device pin 5 configured to electrically connect a device that uses the battery pack as a power supply and the battery pack to each other is inserted, is formed in the upper cover 1.

In addition, a printed circuit board (PCB) 3 having parts configured to control operation of the battery pack mounted thereon and a connector 4, coupled to the PCB 3, for electrical connection with an external device are provided in the battery pack.

In order to electrically connect the battery pack to the device, the device pin 5 is inserted into the connector through the pin insertion port 2 in order to form a contact point. For the connector of the conventional battery pack, however, deformation, such as widening, of the contact point may occur when insertion and separation of the device pin 5 are repeated, whereby poor contact between the connector and the device pin 5 inserted into the connector may occur.

When such poor contact occurs, contact resistance may be increased, whereby heat may be generated or the device may malfunction.

DISCLOSURE

Technical Problem

The present invention has been made in view of the above problems, and it is an object of the present invention to provide a battery pack including a support member provided around a connector, thereby preventing poor contact with a device pin due to deformation of the connector.

Technical Solution

In order to accomplish the above object, a battery pack according to the present invention includes a plurality of battery cells, a pack case configured to receive the plurality of battery cells therein, the pack case including a lower case and an upper cover, a connector located in the pack case, the connector being configured to electrically connect the battery pack to a device, and a printed circuit board (PCB) in the pack case, the connector being coupled to one surface of the PCB, wherein the upper cover includes a plurality of pin insertion ports configured to allow a device pin to be inserted into the connector therethrough, and wherein the upper cover is provided at an inside thereof with a support member located adjacent the connector, the support member being configured to restrict deformation of the connector.

Also, in the battery pack according to the present invention, the connector may include a pair of connector arms bent towards each other at predetermined points so as to each form a contact point with the device pin and a connector connection portion having one side connected to the pair of connector arms and another side coupled to the PCB.

Also, in the battery pack according to the present invention, the support member may be constituted by a pair of bars disposed so as to face each other in the state in which a pin insertion port is located therebetween from among the plurality of pin insertion ports.

Also, in the battery pack according to the present invention, the support member may be provided at each pin insertion port.

Also, in the battery pack according to the present invention, one side of the support member may be connected to an inside of the upper cover, and another side of the support member may extend in a direction toward the PCB.

Also, in the battery pack according to the present invention, a distance between the pair of bars of the support member may be set such that a portion of each of the pair of connector arms contacts an inside of the support member in the state in which the device pin is inserted therebetween, thereby restricting a widening between the pair of connector arms.

Also, in the battery pack according to the present invention, each support member may have a protrusion formed at the pair of bars so as to protrude in a direction toward a corresponding one of the pair of connector arms.

Also, in the battery pack according to the present invention, one surface of the protrusion may contact one of the pair of connector arms when the device pin is inserted into the connector.

Also, in the battery pack according to the present invention, the support member may be made of an elastic material.

Also, in the battery pack according to the present invention, a distance between the pair of bars of the support member may be set such that a portion of each of the pair of connector arms contacts at least one of an inside of the support member and the protrusion in the state in which the device pin is inserted therebetween, thereby restricting a widening between the pair of connector arms.

In addition, the present invention provides a device including the battery pack according to the present invention.

Advantageous Effects

A battery pack according to the present invention has an advantage in that a support member capable of restricting deformation of a connector is provided, whereby it is possible to prevent poor contact between the connector and a device pin.

In addition, the battery pack according to the present invention has an advantage in that electrical contact between the connector and the device pin is satisfactorily maintained despite repeated use, whereby long-term use is possible without poor contact.

In addition, the battery pack according to the present invention has an advantage in that malfunction of a device due to poor contact is reduced, whereby product reliability is improved.

DESCRIPTION OF DRAWINGS

FIG. 1 is a perspective view schematically showing a portion of a conventional battery pack.

FIG. 2 is a perspective view schematically showing the section of a conventional connector into which a device pin is inserted.

FIG. 3 is a perspective view schematically showing a portion of the section of a battery pack including a support member according to an embodiment of the present invention.

FIG. 4 is a perspective view schematically showing a portion of the section of the battery pack including the support member according to the embodiment of the present invention in the state in which a device pin is inserted into the battery pack.

FIG. 5 is a perspective view schematically showing a portion of the section of a battery pack including a support member according to another embodiment of the present invention.

FIG. 6 is a perspective view schematically showing a portion of the section of the battery pack including the support member according to the other embodiment of the present invention in the state in which a device pin is inserted into the battery pack.

FIGS. 7 and 8 are perspective views schematically showing a process of inserting a connector between the support members according to the other embodiment of the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery pack according to the present invention will be described with reference to the accompanying drawings.

FIG. 3 is a perspective view schematically showing a portion of the section of a battery pack including a support member according to an embodiment of the present invention, and FIG. 4 is a perspective view schematically showing a portion of the section of the battery pack including the support member according to the embodiment of the present invention in the state in which a device pin is inserted into the battery pack.

When describing the battery pack according to the present invention in detail with reference to FIGS. 3 and 4, the battery pack is configured such that a plurality of battery cells is received in a pack case including an upper cover 100 and a lower case.

The kind of a battery cell receivable in the pack case is not particularly restricted, and any one of various known battery cells, such as a pouch-shaped battery cell, a cylindrical battery cell, and a prismatic battery cell, may be appropriately used as needed. Depending on circumstances, a plurality of battery cells may be manufactured in the form of a battery module, and may be received in the pack case.

In addition, a printed circuit board (PCB) 300 having various parts configured to control operation of the battery pack mounted thereon is provided at one side of the pack case in the pack case, and a connector 200 for electrical connection with an external device is joined to one surface of the PCB 300.

Here, as shown in FIG. 3, the connector 200 includes a pair of connector arms 210 bent inwards at a point between opposite ends of each thereof so as to form a contact point with a device pin P and a connector connection portion 220 having one end connected to the connector arms 210 and the other end coupled to the PCB 300.

In addition, each of the connector arms 210 is a long plate that is made of an electrically conductive material, such as metal, and that is bent at a point thereof. The distance between the connector arms 210 is gradually decreased with increasing distance from the portions of the connector arm abutting the connector connection portion 220, and the distance between the connector arms 210 is gradually increased from the bent points thereof in a direction toward connector arm distal ends 211.

Meanwhile, the upper cover 100 is provided at a position thereof corresponding to each connector 200 with a pin insertion port 110, through which the device pin P is inserted into the connector 200.

In addition, the upper cover 100 is provided at an inside thereof with a support member 120 configured to prevent poor contact between the connector 200 and the device pin P due to deformation of the connector 200, which may be caused as the result of repeated insertion and separation of the device pin P.

The support member 120 is configured such that a pair of bar-shaped members is located so as to face each other in the state in which a pin insertion port 110 is located therebetween for each connector 200. One side of each support member 120 is connected to an inside of the upper cover 100, and the other side of each support member is formed so as to extend in a direction toward the PCB 300.

When the battery pack including the connector 200 is assembled using the upper cover 100 having the connector 200 provided between the support members 120, as described above, each connector 200 is located between the pair of support members 120.

In the state in which the device pin P is not inserted into the connector 200, the distance between the pair of support members 120 is greater than the distance between the two connector arm distal ends 211. In the state in which the device pin P is inserted into the connector 200, as shown in FIG. 4, the two connector arm distal ends 211 have a distance therebetween to such an extent that the two connector arm distal ends come into contact with the support members 120.

In general, when the device pin P is inserted into the connector 200, the connector arms 210 press the device pin P due to elasticity thereof, whereby contact therebetween is stably maintained.

When the connector 200 is deformed due to repeated use, however, the connector 200 cannot stably hold the device pin P, whereby poor contact therebetween occurs. In order to solve this problem, the support members 120 are provided at the upper cover 100.

That is, in the state in which the device pin P is inserted into the connector 200, the two connector arm distal ends 211 are prevented from being spaced apart from each other by a predetermined distance or more by the support members 120, whereby contact between the connector 200 and the device pin P is stably maintained.

Meanwhile, FIG. 5 is a perspective view schematically showing a portion of the section of a battery pack including a support member according to another embodiment of the present invention, and FIG. 6 is a perspective view schematically showing a portion of the section of the battery pack including the support member according to the other embodiment of the present invention in the state in which a device pin is inserted into the battery pack.

When describing the support member 130 according to the other embodiment of the present invention in detail with reference to FIGS. 5 and 6, the support member 130 includes a protrusion 131 protruding inwards therefrom.

Here, "inwards" means between a pair of support members 130, into which a connector 200 is inserted.

In the case in which the device pin P is inserted into the connector 200 located between the support members 130 each having the protrusion 131, as described above, distal ends of connector arms 210 come into contact with insides of the support members 130, whereby the distal ends of connector arms 210 are prevented from being spaced apart from each other by a predetermined distance or more. Furthermore, the connector arms 210 come into contact with the protrusions 131, whereby the connector arms are prevented from being spaced apart from each other by a predetermined distance or more. Consequently, it is possible to prevent poor contact due to deformation of the connector 200.

The distance between the pair of support members 130 may be formed so as to be equal to the distance between the support members 120 of FIGS. 3 and 4, previously described.

When the distance between the pair of support members 130 is set, as described above, and the size and shape of each protrusion 131 are appropriately designed, the connector arm distal ends 211 contact the support members 130, and at the same time the connector arms 210 contact the protrusions 131, whereby the connector 200 may be prevented from being widened more than necessary.

Meanwhile, contact between the support members 130 and the connector arm distal ends 211 may be performed first or contact between the protrusions 131 and the connector arms 210 may be performed first depending on the distance between the pair of support members 130 and the size and shape of each protrusion 131.

In any case, widening of the connector 200 may be restricted through at least one contact, and therefore it is possible to prevent poor contact between the connector 200 and the device pin P.

Meanwhile, as shown in FIG. 6, the shape of each protrusion 131 may be configured such that one surface of each protrusion that contacts a corresponding one of the connector arms 210 is inclined. At this time, it is preferable for the inclination angle of the protrusion to be equal to the inclination angle of the connector arm 210 that contacts the protrusion.

When one surface of the protrusion 131 is formed so as to have the same inclination angle as the connector arm 210, as described above, there is an advantage in that the protrusion can contact the connector arm 210 over a wide area.

However, the shape of the protrusion 131 is not limited thereto, and may be selected within a range within which the protrusion can contact the connector arm 210 when the device pin P is inserted, whereby it is possible to prevent widening between the connector arms 210.

FIGS. 7 and 8 are perspective views schematically showing a process of inserting the connector between the support members according to the other embodiment of the present invention.

When describing the process of inserting the connector 200 between the support members 130 having the protrusions 131 at the time of assembly of the battery pack with reference to FIGS. 7 and 8, the distance between the support members 130 is increased when the connector arms 210 pass between the protrusions 131 having a small distance therebetween, whereby the connector can be inserted between the support members, since each support member 130 is made of an elastic material and only one side of the support member is fixed to the upper cover 100.

Here, the elastic member is not particularly restricted, and various known materials may be used. However, it is preferable for the support member to be made of the same material as the upper cover 100 to which the support member is coupled or a material capable of easily being joined to the upper cover.

The support members 130 may be integrally formed at the upper cover 100 at the time of manufacture, or may be separately manufactured and then joined to the upper cover 100 using various known methods.

In the battery pack according to the present invention, it is possible to prevent poor contact between the connector 200 and the device pin P due to repeated use simply by adding a simple construction, such as the support members 120 or 130, to the upper cover 100, as described above, and therefore it is possible to increase lifespan of the battery pack.

In addition, when the battery pack is applied to various devices, it is possible to improve product reliability due to defect reduction.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE SYMBOLS

100: Upper cover
110: Pin insertion port
120, 130: Support members
131: Protrusion
200: Connector
210: Connector arm
211: Connector arm distal end
220: Connector connection portion
300: PCB
P: Device pin

The invention claimed is:

1. A battery pack comprising:
a plurality of battery cells;
a pack case configured to receive the plurality of battery cells therein, the pack case comprising a lower case and an upper cover;
a connector located in the pack case, the connector being configured to electrically connect the battery pack to a device; and
a printed circuit board (PCB) in the pack case, the connector being coupled to one surface of the PCB,
wherein the upper cover includes a plurality of pin insertion ports configured to allow a device pin to be inserted into the connector therethrough, and
wherein the upper cover is provided at an inside thereof with a support member located adjacent the connector, the support member being configured to restrict deformation of the connector,
wherein one side of the support member is connected to the inside of the upper cover at an opening of a pin insertion port of the plurality of pin insertion ports,
wherein another side of the support member is a free end that extends in a direction toward the PCB,
wherein the support member is constituted by a pair of bars disposed so as to face each other in a state in which the pin insertion port is located therebetween from among the plurality of pin insertion ports, and
wherein free ends of the support member constituted by the pair of bars are not connected to each other.

2. The battery pack according to claim 1, wherein the connector comprises:
a pair of connector arms bent towards each other at predetermined points so as to each form a contact point with the device pin; and
a connector connection portion having one side connected to the pair of connector arms and another side coupled to the PCB.

3. The battery pack according to claim 1, wherein the support member is provided at each pin insertion port.

4. The battery pack according to claim 1, wherein a distance between the pair of bars of the support member is set such that a portion of each of the pair of connector arms contacts an inside of the support member in a state in which the device pin is inserted therebetween, thereby restricting a widening between the pair of connector arms.

5. The battery pack according to claim 1, wherein each support member has a protrusion formed at the pair of bars so as to protrude in a direction toward a corresponding one of the pair of connector arms.

6. The battery pack according to claim 5, wherein one surface of the protrusion contacts one of the pair of connector arms when the device pin is inserted into the connector.

7. The battery pack according to claim 5, wherein the support member is made of an elastic material.

8. The battery pack according to claim 5, wherein a distance between the pair of bars of the support member is set such that a portion of each of the pair of connector arms contacts at least one of an inside of the support member and the protrusion in a state in which the device pin is inserted therebetween, thereby restricting a widening between the pair of connector arms.

9. A device comprising the battery pack according to claim 1.

10. The battery pack according to claim 1, wherein the connector includes a connector arm distal end, and
wherein the connector arm distal end of the connector is located at a corner formed by the one side of the support member being connected to the inside of the upper cover at the opening of the pin insertion port.

11. The battery pack according to claim 10, wherein between the one side and the another side of the support member, a space is located between the support member and the connector.

12. The battery pack according to claim 11, wherein the connector has one bent portion between the connector arm distal end and an end opposite to the connector arm distal end, and
wherein a distance between the support member and the connector in the space is greatest at the one bent portion.

* * * * *